(12) United States Patent
Kitora et al.

(10) Patent No.: US 11,285,762 B2
(45) Date of Patent: Mar. 29, 2022

(54) TYRE

(71) Applicant: Sumitomo Rubber Industries, Ltd., Kobe (JP)

(72) Inventors: Ryuta Kitora, Kobe (JP); Ryo Oba, Kobe (JP); Yasutaka Ishitobi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 344 days.

(21) Appl. No.: 16/415,735

(22) Filed: May 17, 2019

(65) Prior Publication Data
US 2019/0366778 A1 Dec. 5, 2019

(30) Foreign Application Priority Data

May 29, 2018 (JP) .............................. JP2018-102574
May 31, 2018 (JP) .............................. JP2018-105187

(51) Int. Cl.
*B60C 11/12* (2006.01)
*B60C 11/03* (2006.01)

(52) U.S. Cl.
CPC ........ *B60C 11/125* (2013.01); *B60C 11/0304* (2013.01); *B60C 11/0306* (2013.01);
(Continued)

(58) Field of Classification Search
CPC ............. B60C 11/0304; B60C 11/0306; B60C 11/0332; B60C 11/04; B60C 11/12;
(Continued)

(56) References Cited

U.S. PATENT DOCUMENTS

2018/0319219 A1\* 11/2018 Oba .................... B60C 11/0306

FOREIGN PATENT DOCUMENTS

| CN | 106347034 A | \* | 1/2017 | ......... | B60C 11/1259 |
| EP | 1529659 A2 | \* | 5/2005 | ......... | B60C 11/0304 |

(Continued)

OTHER PUBLICATIONS

Extended European Search Report for European Application No. 19174269.1, dated Aug. 2, 2019.

*Primary Examiner* — Steven D Maki
*Assistant Examiner* — Philip N Schwartz
(74) *Attorney, Agent, or Firm* — Birch, Stewart, Kolasch & Birch, LLP

(57) ABSTRACT

A tyre includes a tread portion including an outboard middle land portion disposed between an outboard tread edge and a tyre equator. The outboard middle land portion includes first and second longitudinal edges, outboard middle lateral grooves extending from the first longitudinal edge and having terminal ends within the outboard middle land portion, first outboard middle sipes extending from the respective terminal ends of the outboard middle lateral grooves to the second longitudinal edge, and second outboard middle sipes extending from the first longitudinal edge toward the second longitudinal edge beyond the terminal ends of the outboard middle lateral grooves and terminating within the outboard middle land portion. The outboard middle land portion is not provided with any lateral grooves that extend from the second longitudinal edge toward the first longitudinal edge to reach an axial center location of the outboard middle land portion.

20 Claims, 8 Drawing Sheets

(52) U.S. Cl.
CPC ...... *B60C 11/0332* (2013.01); *B60C 11/1236* (2013.01); *B60C 11/1272* (2013.01); *B60C 2011/0334* (2013.01); *B60C 2011/0348* (2013.01); *B60C 2011/0351* (2013.01); *B60C 2011/0353* (2013.01); *B60C 2011/0355* (2013.01); *B60C 2011/0365* (2013.01); *B60C 2011/0367* (2013.01); *B60C 2011/0369* (2013.01); *B60C 2011/0381* (2013.01); *B60C 2011/0395* (2013.01)

(58) Field of Classification Search
CPC ............... B60C 11/125; B60C 11/1236; B60C 11/1263; B60C 11/1272; B60C 11/1384; B60C 2011/0334; B60C 2011/0341; B60C 2011/0348; B60C 2011/0351; B60C 2011/0353; B60C 2011/0355; B60C 2011/0358; B60C 2011/0365; B60C 2011/0367; B60C 2011/0369; B60C 2011/0381; B60C 2011/039; B60C 2011/0395
USPC ................................................. D12/505–532
See application file for complete search history.

(56) References Cited

FOREIGN PATENT DOCUMENTS

| | | | | |
|---|---|---|---|---|
| EP | 3260308 A1 | 12/2017 | | |
| EP | 3398793 A1 | 11/2018 | | |
| JP | 2013035449 A | * | 2/2013 | ............... B60C 5/00 |
| JP | 2015-13604 A | | 1/2015 | |

\* cited by examiner

Comparative Example

TYRE

BACKGROUND ART

Field of the Disclosure

The present disclosure relates to tyres, more particularly to a tyre capable of being suitably used for all-season tyre.

Description of the Related Art

All-season tyres have been required to exhibit basic driving performance not only on dry road conditions but also on snowy road conditions. In order to improve driving performance on slippery snowy road conditions, such tyres have been required to exhibit powerful snow shearing force as well as ground scratching effect. Snow shearing force is generated by being compressed snow on the ground and then shearing it. Accordingly, in order to improve on-snow performance, it has been effective that a large number of long lateral grooves are provided on the tread portion. Further, edges of lateral grooves and sipes can improve traction by scratching compressed snow surface of the ground. The following patent document 1 may be considered as a related document.

PATENT DOCUMENT

[Patent document 1] JP2015-013604A1

SUMMARY OF THE DISCLOSURE

Unfortunately, although lateral grooves and sipes provided on tread portions are helpful to improve on-snow performance, they reduce pattern rigidity of tread portions to be prone to deteriorate steering stability on dry road conditions.

The present disclosure has been made in view of the above problem and has a major object to provide tyres capable of improving steering stability on dry road conditions as well as on-snow performance.

According to one aspect of the disclosure, a tyre include a tread portion having a designated mounting direction to a vehicle, the tread portion including an outboard tread edge which is positioned away from a center of a vehicle when the tyre is mounted to the vehicle, an inboard tread edge which is positioned toward the center of the vehicle when the tyre is mounted to the vehicle, and an outboard middle land portion disposed between the outboard tread edge and a tyre equator. The outboard middle land portion includes a first longitudinal edge extending in a tyre circumferential direction on the inboard tread edge side of the outboard middle land portion, a second longitudinal edge extending in the tyre circumferential direction on the outboard tread edge side of the outboard middle land portion, a ground contact surface formed between the first longitudinal edge and the second longitudinal edge, outboard middle lateral grooves extending from the first longitudinal edge and having terminal ends terminating within the outboard middle land portion, first outboard middle sipes extending from the respective terminal ends of the outboard middle lateral grooves to the second longitudinal edge, and second outboard middle sipes extending from the first longitudinal edge toward the second longitudinal edge beyond the terminal ends of the outboard middle lateral grooves and terminating within the outboard middle land portion. The outboard middle land portion is not provided with any lateral grooves that extend from the second longitudinal edge toward the first longitudinal edge so as to reach a center location in a tyre axial direction of the outboard middle land portion.

In another aspect of the disclosure, the tread portion may further include an outboard shoulder main groove extending continuously in the tyre circumferential direction adjacent to the outboard middle land portion on the outboard tread edge side, and an outboard shoulder land portion defined between the outboard shoulder main groove and the outboard tread edge, wherein the outboard shoulder land portion may be provided with outboard shoulder lateral grooves extending from the outboard shoulder main groove to the outboard tread edge.

In another aspect of the disclosure, each outboard shoulder lateral groove may include a first groove portion extending from the outboard shoulder main groove and a second groove portion connected to the first groove, wherein the second portion may have a groove width greater than that of the first groove portion and extends to the outboard tread edge.

In another aspect of the disclosure, a length in the tyre axial direction of the first groove portion of each outboard shoulder lateral groove may be greater than lengths in the tyre axial direction of the outboard middle lateral grooves.

In another aspect of the disclosure, the outboard shoulder land portion may include a corner formed between a ground contact surface thereof and a land sidewall, and the corner may be provided with one or more chamfered portions.

In another aspect of the disclosure, each chamfered portion may be connected to a respective one of the outboard shoulder lateral grooves.

In another aspect of the disclosure, regions where the chamfered portions are extended in the tyre axial direction may cross at least one of the second outboard middle sipes.

In another aspect of the disclosure, a groove width of the first groove portion of each outboard shoulder lateral groove may be smaller than groove widths of the outboard middle lateral grooves.

In another aspect of the disclosure, a groove width of the second groove portion of each outboard shoulder lateral groove may be greater than groove widths of the outboard middle lateral grooves.

In another aspect of the disclosure, a groove depth of the second groove portion may be greater than a groove depth of the first groove portion.

In another aspect of the disclosure, the tread portion may further include an inboard middle land portion disposed between the inboard tread edge and the tyre equator, wherein the inboard middle land portion may include a first longitudinal edge extending in the tyre circumferential direction on the inboard tread edge side of the inboard middle land portion, a second longitudinal edge extending in the tyre circumferential direction on the outboard tread edge side of the inboard middle land portion, a ground contact surface formed between the first longitudinal edge and the second longitudinal edge, and inboard middle lateral grooves extending from the first longitudinal edge of the inboard middle land portion to terminal ends thereof terminating within the inboard middle land portion, wherein ratios $L_i/W_i$ of respective lengths $L_i$ in the tyre axial direction of the inboard middle lateral grooves to a width $W_i$ in the tyre axial direction of the inboard middle land portion may be greater than ratios $L_o/W_o$ of respective lengths $L_o$ in the tyre axial direction of the outboard middle lateral grooves to a width $W_o$ in the tyre axial direction of the outboard middle land portion.

In another aspect of the disclosure, the lengths Li of the inboard middle lateral grooves may be greater than the lengths Lo of the outboard middle lateral grooves.

In another aspect of the disclosure, the inboard middle land portion may further be provided with first inboard middle sipes extending from the terminal ends of the respective inboard middle lateral grooves to the second longitudinal edge of the inboard middle land portion.

In another aspect of the disclosure, regions where the first inboard middle sipes are extended toward the outboard tread edge may cross regions where the outboard middle lateral grooves are extended toward the inboard tread edge.

In another aspect of the disclosure, the inboard middle land portion may not be provided with any lateral grooves that extend from the second longitudinal edge of the inboard middle land portion toward the first longitudinal edge of the inboard middle land portion so as to reach a center location in the tyre axial direction of the inboard middle land portion.

In another aspect of the disclosure, the inboard middle lateral grooves may extend in a constant groove width, and the outboard middle lateral grooves may extend in a constant groove width.

In another aspect of the disclosure, the outboard middle lateral grooves may extend so as to reach a center location in the tyre axial direction of the outboard middle land portion.

In another aspect of the disclosure, the outboard middle land portion may include a corner formed between the ground contact surface thereof and a land sidewall on the first longitudinal edge side of the outboard middle land portion, and the corner may be provided with one or more chamfered portions.

In another aspect of the disclosure, the inboard middle land portion may include a corner formed between a ground contact surface thereof and a land sidewall on the first longitudinal edge of the inboard middle land portion, and the corner portion of the inboard middle land portion may be provided with one or more chamfered portions.

In another aspect of the disclosure, lengths in the tyre circumferential direction of the chamfered portions provided on the inboard middle land portion may be greater than lengths in the tyre circumferential direction of the chamfered portions provided on the outboard middle land portion.

DESCRIPTION OF THE PREFERRED EMBODIMENTS

Figure 1:
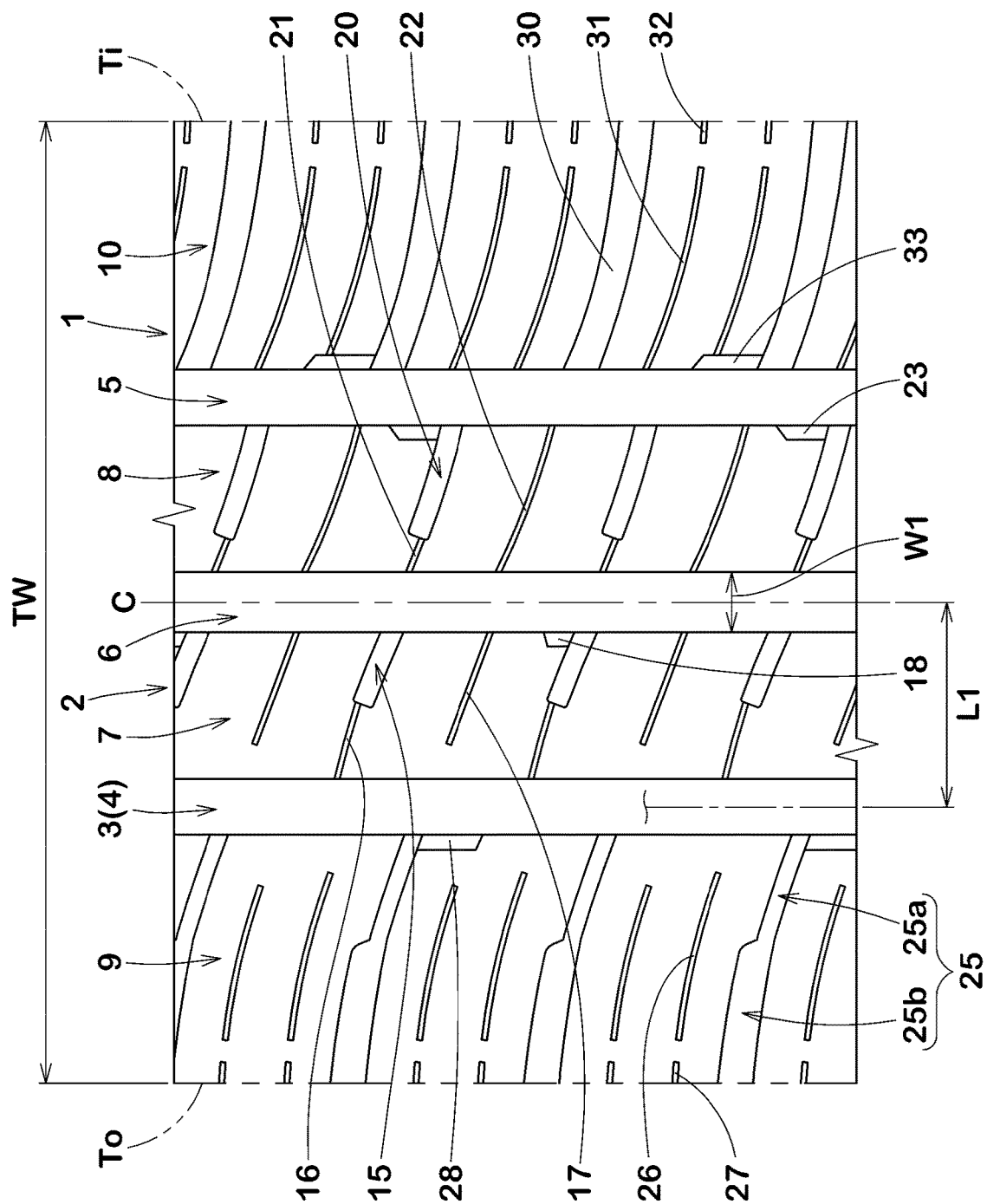
FIG. 1 is a development view of a tread portion of a tyre in accordance with an embodiment of the present disclosure.

An embodiment of the present disclosure will be explained below with reference to the accompanying drawings. FIG. 1 illustrates a development view of a tread portion 2 of a tyre 1 in accordance with an embodiment of the present disclosure. The tyre 1 according to the present embodiment, for example, is configured as a pneumatic tyre. In the present embodiment, as a preferred embodiment, an all-season tyre which is intended to be mounted on a passenger car and SUV is illustrated.

As illustrated in FIG. 1, the tyre 1 according to the present embodiment includes the tread portion 2 having a designated mounting direction to a vehicle. The tread portion 2 of the tyre 1 according to the present embodiment has a left-right asymmetric tread pattern. The tread portion 2 includes an outboard tread edge To which is positioned away from a center of a vehicle when the tyre is mounted to the vehicle, and an inboard tread edge Ti which is positioned toward the center of the vehicle when the tyre is mounted to the vehicle. The mounting direction to a vehicle, for example, may be indicated using letters or a mark on a tyre sidewall portion (not illustrated).

When the tyre 1 is a pneumatic tyre, the respective tread edges To and Ti are defined as axially outermost edges of the ground contacting patch of the tread portion 2 which occurs under a normal state with a standard tyre load when the camber angle of the tyre is zero. As used herein, the normal state is such that the tyre is mounted on a standard wheel rim with a standard pressure but loaded with no tyre load. Unless otherwise noted, dimensions of respective portions of the tyre are values measured under the normal state.

The standard wheel rim is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

The standard pressure is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

The standard tyre load is a tyre load officially approved for each tyre by standards organizations in which the tyre is based, wherein the standard tyre load is the "maximum load capacity" in JATMA, the maximum value given in the above-mentioned table in TRA, the "Load Capacity" in ETRTO, for example.

In the present embodiment, the tread portion 2, for example, is provided with main grooves 3 which extend in the tyre circumferential direction continuously. The main grooves 3, for example, may include an outboard shoulder main groove 4 arranged nearest to the outboard tread edge To side in the main grooves 3, an inboard shoulder main groove 5 arranged nearest to the inboard tread edge Ti side in the main grooves 3, and one or more crown main grooves 6 arranged therebetween. In the present embodiment, as one or more crown main grooves, a single crown main groove 6 is provided on the tyre equator C. Thus, the tread portion 2 is divided into four land portions. In another aspect, the tread portion 2, for example, may be divided into five land portions by the outboard shoulder main groove 4, the inboard shoulder main groove 5, and two crown main grooves 6. In this aspect, two crown main grooves 6 may be arranged such that the tyre equator C is located therebetween.

It is preferable that distances L1 in the tyre axial direction from the tyre equator C to a respective one of groove centerlines of the outboard shoulder main groove 4 and the inboard shoulder main groove 5, for example, are in a range of from 0.15 to 0.25 times of the tread width TW. The tread width TW is an axial distance from the outboard tread edge To to the inboard tread edge Ti under the normal state.

The main grooves 3, for example, extend in a straight manner in the tyre circumferential direction. Alternatively, the main grooves 3, for example, extend in a zigzag manner. Groove widths W1 of the main grooves 3, for example, are preferably in a range of from 4.0% to 7.0% of the tread width TW. Groove depths of the main grooves 3, for example, are in a range of from 5.0 to 12.0 mm. Such main grooves 3 may improve steering stability on dry road conditions as well as on-snow performance in a well-balanced manner.

In the present embodiment, the tread portion 2 includes an outboard middle land portion 7, an inboard middle land portion 8, an outboard shoulder land portion 9, and an inboard shoulder land portion 10. The outboard middle land portion 7 is disposed between the tyre equator C and the outboard tread edge To, more specifically between the crown main groove 6 and the outboard shoulder main groove 4. The inboard middle land portion 8 is disposed between the tyre equator C and the inboard tread edge Ti, more specifically between the crown main groove 6 and the inboard shoulder main groove 5. The outboard shoulder land portion 9 is defined between the outboard shoulder main groove 4 and the outboard tread edge To. The inboard shoulder land portion 10 is defined between the inboard shoulder main groove 5 and the inboard tread edge Ti.

Figure 2:
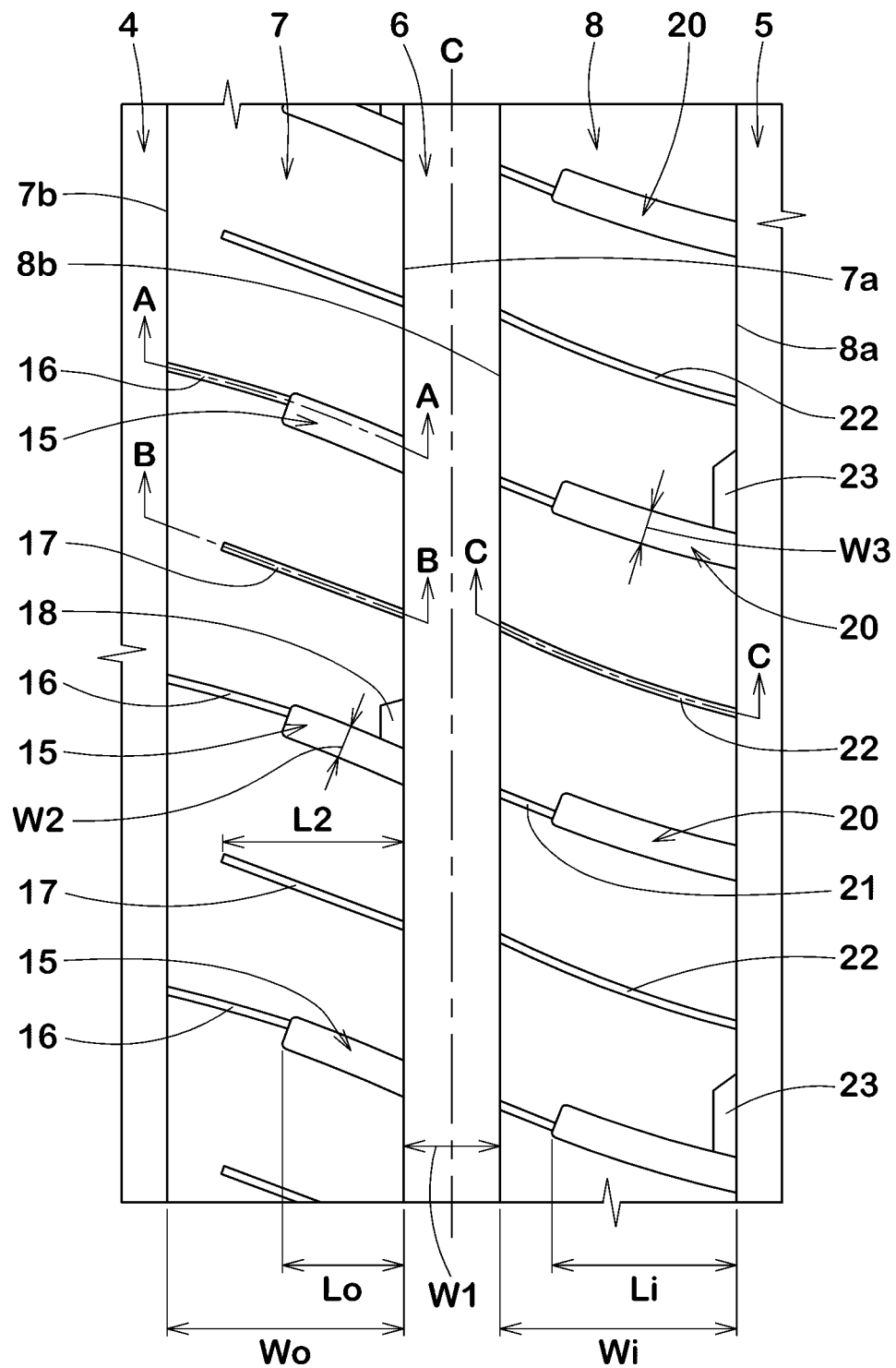
FIG. 2 is an enlarged view of an outboard middle land portion and an inboard middle land portion of FIG. 1.

FIG. 2 illustrates an enlarged view of the outboard middle land portion 7 and the inboard middle land portion 8. As illustrated in FIG. 2, the outboard middle land portion 7 includes a first longitudinal edge 7a extending in the tyre circumferential direction on the inboard tread edge ii side of the outboard middle land portion 7, a second longitudinal edge 7b extending in the tyre circumferential direction on the outboard tread edge To side of the outboard middle land portion 7, and a ground contact surface formed between the first longitudinal edge 7a and the second longitudinal edge 7b. Similarly, the inboard middle land portion 8 includes a first longitudinal edge 8a extending in the tyre circumferential direction on the inboard tread edge Ti side of the inboard middle land portion 8, a second longitudinal edge 8b extending in the tyre circumferential direction on the outboard tread edge To side of the inboard middle land portion 8, and a ground contact surface formed between the first longitudinal edge 8a and the second longitudinal edge 8b.

The outboard middle land portion 7 is provided with outboard middle lateral grooves 15, first outboard middle sipes 16, and second outboard middle sipes 17. The outboard middle lateral grooves 15 extend from the first longitudinal edge 7a and have terminal ends terminating within the outboard middle land portion 7. The first outboard middle sipes 16 extend from the respective terminal ends of the outboard middle lateral grooves 15 to the second longitudinal edge 7b. The second outboard middle sipes 17 extend from the first longitudinal edge 7a toward the second longitudinal edge 7b beyond the terminal ends of the outboard middle lateral grooves 15 and terminate within the outboard middle land portion 7. As used herein, a "sipe" shall mean an incision having a width of less than 1.5 mm, more preferably 0.5 to 1.0 mm, for example.

The outboard middle lateral grooves 15, when driving on snow, can generate snow-shearing force. Further, since the outboard middle lateral grooves 15 extend from the first longitudinal edge 7a and terminate within the outboard middle land portion 7, reduction in rigidity of the outboard middle land portion 7 on the second longitudinal edge 7b side can be suppressed, and thus deterioration of steering stability can be suppressed.

The first outboard middle sipes 16 which are incisions having a narrower width can make the outboard middle lateral grooves 15 open easily so that an amount of snow entering into the outboard middle lateral grooves increase while suppressing excessive reduction in rigidity of the land portion. The second outboard middle sipes 17 can provide land pieces between the outboard middle lateral grooves 15 and the second outboard middle sipes 17 on the first longitudinal edge 7a side with better flexibility while maintaining rigidity of the outboard middle land portion 7 on the second longitudinal edge 7b side. Thus, snow entered into the outboard middle lateral grooves 15 can be firmly compressed. As described above, the present disclosure, due to a layout of the first outboard middle sipes 16 and the second outboard middle sipes 17, generate powerful snow-shearing force by the outboard middle lateral grooves 15, exhibiting excellent on-snow performance.

The outboard middle land portion 7 is not provided with any lateral grooves that extend from the second longitudinal edge 7b toward the first longitudinal edge 7a so as to reach a center location in the tyre axial direction of the outboard middle land portion 7. Generally, this kind of groove tends to reduce rigidity of the land portion around the second longitudinal edge 7b excessively. In the present disclosure, since this kind of groove is not provided, maintaining sufficient rigidity of the outboard middle land portion 7 to exhibit excellent steering stability.

In some preferred embodiments, the outboard middle land portion 7 is not provided with any lateral grooves that extend from the second longitudinal edge 7b in a length which is greater than 0.25 times the axial width Wo of the outboard middle land portion 7. In some yet preferred embodiments, as the present embodiment, the outboard middle land portion 7 is not provided with any lateral grooves that extend from the second longitudinal edge 7b, but provided with only sipes as one connected to the second longitudinal edge 7b. Further, the second longitudinal edge 7b is not provided with any chamfered portions on a corner between the ground contact surface and the land sidewall. Such an outboard middle land portion 7 can exhibit high rigidity around the second longitudinal edge 7b, offering excellent steering stability further.

It is preferable that ratios Lo/Wo of respective lengths Lo in the tyre axial direction of the outboard middle lateral grooves 15 to the width Wo in the tyre axial direction of the outboard middle land portion 7 are in a range of from 0.40 to 0.60, for example. In this embodiment, the outboard middle lateral grooves 15, for example, reach the center location in the tyre axial direction of the outboard middle land portion 7. Such an outboard middle lateral grooves 15 can improve steering stability on dry road conditions and on-snow performance in a well-balanced manner.

Preferably, the outboard middle lateral grooves 15, for example, are inclined with respect to the tyre axial direction. Preferably, angles of the outboard middle lateral grooves 15 are preferably less than 30 degrees with respect to the tyre axial direction, more preferably of from 15 to 25 degrees, for example. Such outboard middle lateral grooves 15 can generate powerful traction on snow.

Preferably, the outboard middle lateral grooves 15, for example, extend in a constant groove width. Note that "extend in a constant groove width" shall be understood to include an aspect that the difference between the maximum groove width and the minimum groove width of the lateral groove is less than 5° % of the maximum groove width of the lateral groove. Preferably, groove widths W2 of the outboard middle lateral grooves 15, for example, are in a range of from 0.25 to 0.40 times the groove widths W1 of the main grooves 3.

Preferably, the first outboard middle sipes 16, for example, are inclined in the same direction as the outboard middle lateral grooves 15 with respect to the tyre axial direction. Further, angles of the first outboard middle sipes 16 with respect to the tyre axial direction are less than 30 degrees.

Figure 3A:
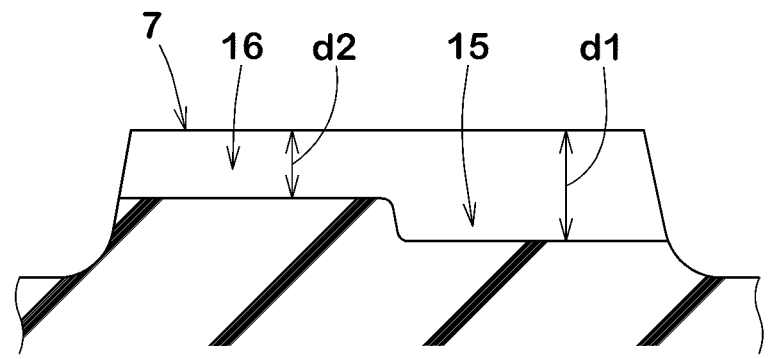
FIG. 3A and FIG. 3B are cross-sectional views taken along lines A-A and B-B of FIG. 2, respectively.

FIG. 3A illustrates a cross-sectional view showing a couple of one outboard middle lateral groove 15 and one first outboard middle sipe 16 taken along line A-A of FIG. 2. As illustrated in FIG. 3A, is it preferable that the first outboard middle sipe 16 has a depth d2 in a range of from 0.50 to 0.70 times of a depth d1 of the outboard middle lateral groove 15. Such a first outboard middle sipe 16, while suppressing reduction in rigidity of the outboard middle land portion 7, can improve on-snow performance.

As illustrated in FIG. 2, the second outboard middle sipes 17, for example, terminate on the second longitudinal edge 7b side with respect to the center location in the tyre axial direction of the outboard middle land portion 7. Preferably, lengths L2 in the tyre axial direction of the second outboard middle sipes 17, for example, are in a range of from 0.65 to 0.85 times the width Wo in the tyre axial direction of the outboard middle land portion 7. Further, the lengths L2 of the second outboard middle sipes 17 are preferably in a range of from 1.40 to 1.60 times the lengths Lo in the tyre axial direction of the outboard middle lateral grooves 15. Thus, land pieces between the outboard middle lateral grooves 15 and the second outboard middle sipes 17 tend to move easily. Accordingly, when driving on snow, snow entered into the outboard middle lateral grooves 15 can be compressed firmly so that powerful traction can be generated.

The second outboard middle sipes 17, for example, are inclined in the same direction as the outboard middle lateral grooves 15 with respect to the tyre axial direction. Preferably, angles of the second outboard middle sipes 17 with respect to the tyre axial direction are in a range of from 10 to 30 degrees, for example.

Figure 3B:
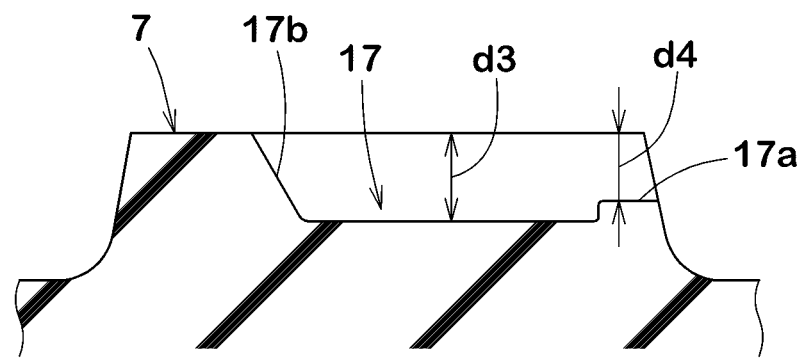

FIG. 3B illustrates a cross-sectional view of one of the second outboard middle sipes 17 taken along line B-B of FIG. 2. As illustrated in FIG. 3B, each second outboard middle sipe 17, for example, includes a shallow bottom portion 17a provided at an end portion on the first longitudinal edge 7a side and a gradually-reduced portion 17b having a depth reducing gradually to the terminal end on the second longitudinal edge 7b side. Preferably, the shallow bottom portion 17a has a depth d4 in a range of from 0.70 to 0.90 times the maximum depth d3 of the second outboard middle sipe 17. Since the second outboard middle sipes 17 include the shallow bottom portion 17a and the gradually-reduced portion 17b, excessive opening of the second outboard middle sipes 17 can be suppressed, and thus deterioration of steering stability on dry road conditions can also be suppressed.

Figure 3C:
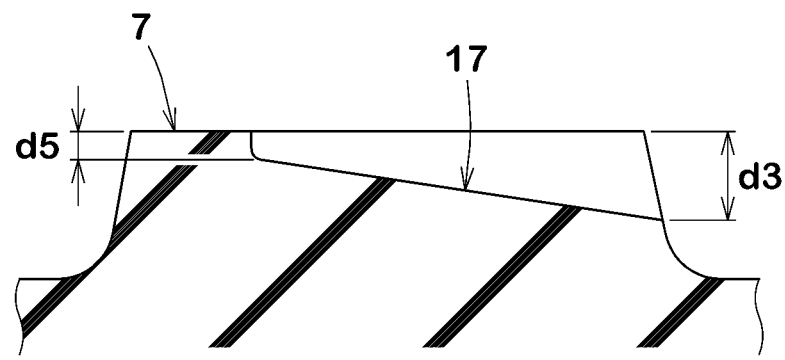
FIG. 3C is a cross-sectional view of a second outboard middle sipe in accordance with another embodiment.

FIG. 3C illustrates a cross-sectional view of one second outboard middle sipe 17 in accordance with another embodiment. As illustrated in FIG. 3C, the second outboard middle sipe 17 in accordance with the embodiment has a depth which reduces from the end on the first longitudinal edge 7a side to the terminal end continuously. In the embodiment, a ratio d5/d3 of the minimum depth d5 to the maximum depth d3 of the second outboard middle sipe 17 is in a range of from 0.20 to 0.40, for example. Since the outboard middle land portion 7 provided with such a second outboard middle sipe 17 has rigidity in tyre circumferential direction increasing toward the second longitudinal edge 7b, steering response when cornering can be linear.

As illustrated in FIG. 2, the outboard middle land portion 7 is further provided with one or more chamfered portions 18 on a corner between the ground contact surface and a land sidewall on the first longitudinal edge 7a side. In this embodiment, each chamfered portion 18, for example, is connected to a respective one of the outboard middle lateral grooves 15. Such a chamfered portion 18 can suppress uneven wear of the outboard middle land portion 7. Further, each chamfered portion 18, when traveling on snow, can be helpful to integrate snow in the outboard middle lateral groove 15 with snow in the crown main groove 6, resulting in suppressing snow clogging in the outboard middle lateral groove 15.

The inboard middle land portion 8 is provided with inboard middle lateral grooves 20 extending from the first longitudinal edge 8a and terminating within the inboard middle land portion 8. The inboard middle lateral grooves 20, when traveling on snow, can generate snow-shearing force. Further, the inboard middle lateral grooves 20 suppress reduction in rigidity of the inboard middle land portion 8 on the second longitudinal edge 8b side, resulting in suppressing deterioration of steering stability.

It is preferable that ratios Li/Wi of respective lengths Li in the tyre axial direction of the inboard middle lateral grooves 20 to a width Wi in the tyre axial direction of the inboard middle land portion 8 are greater than ratios Lo/Wo of the respective lengths Lo in the tyre axial direction of the outboard middle lateral grooves 15 to the width Wo in the tyre axial direction of the outboard middle land portion 7. Thus, in the inboard middle land portion 8 on which a large ground contact pressure acts, sufficient length of the lateral grooves can be maintained, and thus excellent on-snow performance can be exhibited.

In addition, the above-mentioned layout of the lateral grooves may increase rigidity of the outboard middle land portion 7 relatively. Thus, the present embodiment can provide tyres which have large self-aligning torque (hereinafter, it may simply be referred to as "SAT"). For example, when tyres having large SAT are mounted to an FF passenger vehicle on its all wheels, cornering power (hereinafter, referred to as "CP") generated by front wheel tyres tends to decrease relatively due to SAT to approach to CP generated by rear wheel tyres. Accordingly, passenger vehicles equipped with tyres according to the present disclosure on its all wheels, when a steering angle is applied to the front wheels, tends to shift to a steady state easily where cornering force generated by the front wheel tyres substantially balances with cornering force generated by the rear wheels tyres, and thus excellent steering stability can be exhibited.

The above-mentioned ratios Li/Wi, for example, are preferably in a range of from 0.70 to 0.90. Further, it is preferable that the lengths Li of the inboard middle lateral grooves 20 are longer than the lengths Lo of the outboard middle lateral grooves 15. Thus, the tyre 1 can improve on-snow performance further.

The inboard middle land portion 8 is not provided with any lateral grooves that extend from the second longitudinal edge 8b toward the first longitudinal edge 8a and that reach the center location in the tyre axial direction of the inboard middle land portion 8. In some preferred embodiments, the inboard middle land portion 8 is not provided with any lateral grooves that extend from the second longitudinal edge 8b and that has a length greater than 0.25 times the width Wi of the inboard middle land portion 8. In some yet preferred embodiments, as the present embodiment, the inboard middle land portion 8 is not provided with any lateral grooves that extend from the second longitudinal edge 8b, but provided with only sipes as one connected to the second longitudinal edge 8b. In addition, the second longitudinal edge 8b is not provided with any chamfered portions that are recessed on the corner between the ground contact surface and the land sidewall. Such an inboard middle land portion 8 can improve steering stability on dry road conditions further.

It is preferable that the inboard middle lateral grooves 20, for example, are inclined in the same direction as the outboard middle lateral grooves 15. Angles of the inboard middle lateral grooves 20 with respect to the tyre axial direction are less than 30 degrees, for example, more preferably in a range of from 15 to 25 degrees. Such inboard middle lateral grooves 20 can improve traction and cornering performance on snow in a well-balanced manner.

It is preferable that the inboard middle lateral grooves 20 extend in a constant groove width. Preferably, the groove width W3 of the inboard middle lateral grooves 20, for example, is in a range of from 0.25 to 0.40 times the groove widths W1 of the main grooves 3.

The inboard middle land portion 8 is further provided with first inboard middle sipes 21 and second inboard middle sipes 22.

The first inboard middle sipes 21, for example, extend from the respective terminal ends of the inboard middle lateral grooves 20 to the second longitudinal edge 8b. Preferably, the first inboard middle sipes 21, for example, are inclined in the same direction as the inboard middle lateral grooves 20 with respect to the tyre axial direction. Preferably, angles of the first inboard middle sipes 21 with respect to the tyre axial direction, for example, are less than 30 degrees.

It is preferable that regions where the first inboard middle sipes 21 are extended along its longitudinal direction toward the outboard tread edge To cross regions where the outboard middle lateral grooves 15 are extended along its longitudinal direction toward the inboard tread edge Ti within the crown main groove 6. Such a layout of lateral grooves and sipes tends to make each lateral groove open easily so as to improve on-snow performance.

The second inboard middle sipes 22, for example, extend from the first longitudinal edge 8a to the second longitudinal edge 8b. The second inboard middle sipes 22 can improve traction on snow road conditions.

It is preferable that the second inboard middle sipes 22, for example, are inclined in the same direction as the inboard middle lateral grooves 20 with respect to the tyre axial direction. Angles of the second inboard middle sipes 22 with respect to the tyre axial direction, for example, are in a range of from 10 to 30 degrees.

Figure 4:
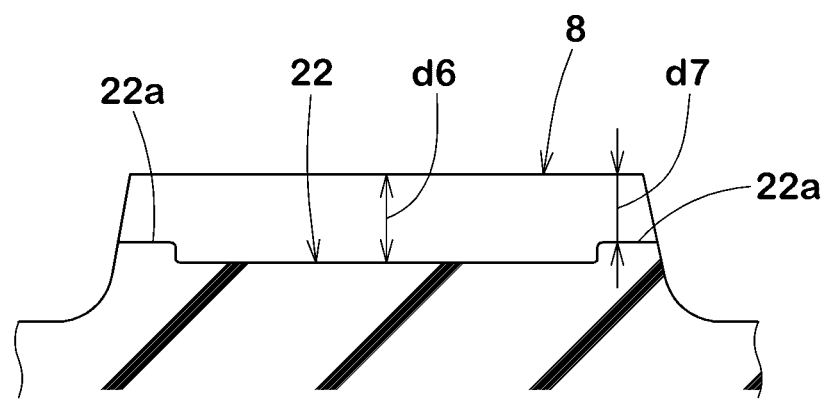
FIG. 4 is a cross-sectional view taken along line C-C of FIG. 2.

FIG. 4 illustrates a cross-sectional view of one of the second inboard middle sipes 22 taken along line C-C of FIG. 2. As illustrated in FIG. 4, the second inboard middle sipes 22 preferably have shallow bottom portions 22a on its both ends in the tyre axial direction. Depths d7 of the shallow bottom portions 22a, for example, are in a range of from 0.70 to 0.90 times the maximum depths d6 of the second inboard middle sipe 22. Such a second inboard middle sipe 22 can improve on-snow performance while suppressing deterioration of steering stability.

As illustrated in FIG. 2, the inboard middle land portion 8 is further provided with one or more chamfered portions 23 on a corner between the ground contact surface and a land sidewall on the first longitudinal edge 8a side. In this embodiment, the chamfered portions 23, for example, are connected to a respective one of inboard middle lateral grooves 20. Such chamfered portions 23 can suppress uneven wear of the inboard middle land portion 8. Further, lengths in the tyre circumferential direction of the chamfered portions 23 provided on the inboard middle land portion 8 are greater than the length in the tyre circumferential direction of the chamfered portions 18 provided on the outboard middle land portion 7. Thus, the wear difference between the inboard middle land portion 8 and the outboard middle land portion 7 based on the ground contact pressure difference can be small.

Figure 5:
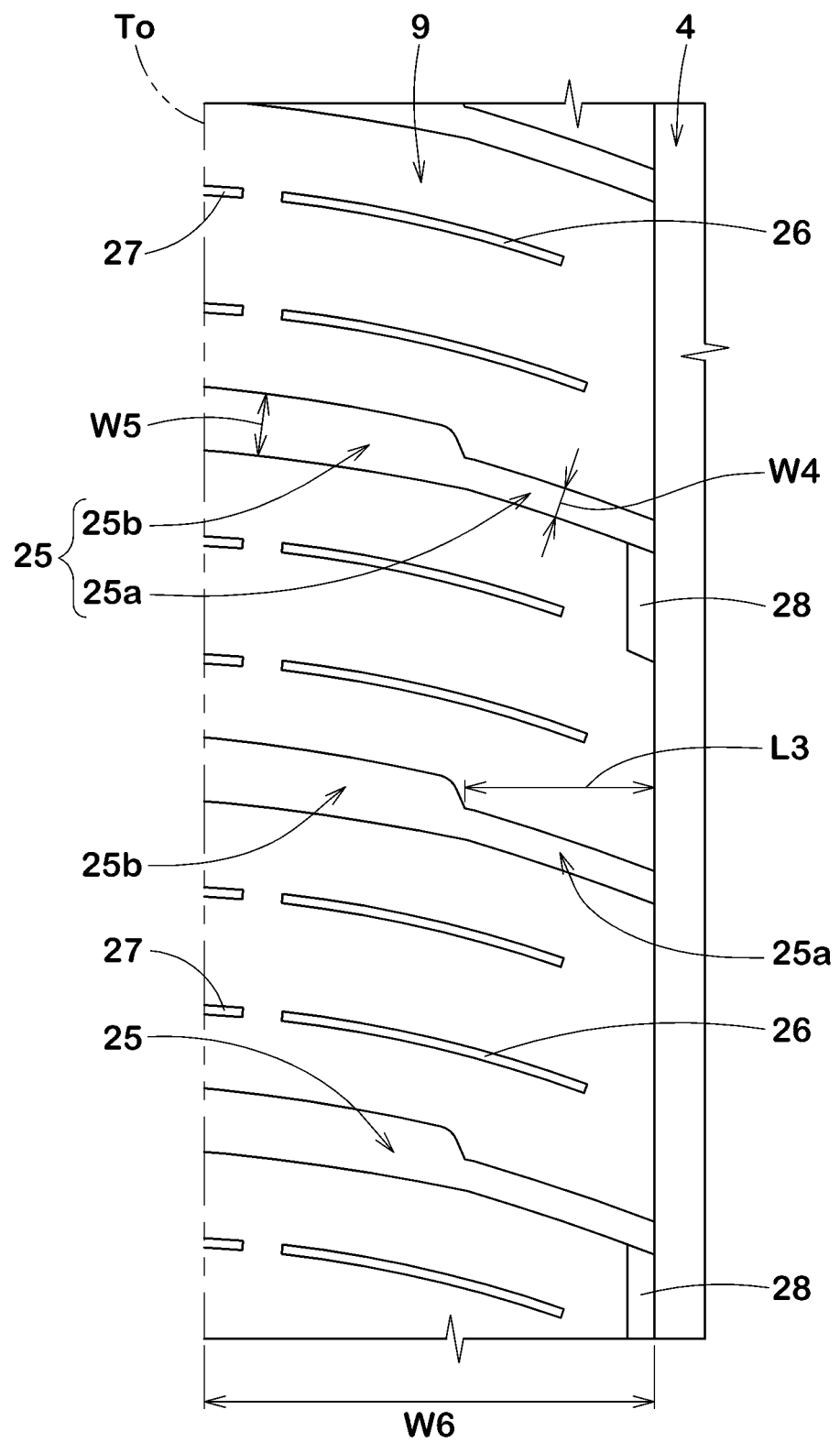
FIG. 5 is an enlarged view of an outboard shoulder land portion of FIG. 1.

FIG. 5 illustrates an enlarged view of the outboard shoulder land portion 9. As illustrated in FIG. 5, the outboard shoulder land portion 9 is provided with outboard shoulder lateral grooves 25, first outboard shoulder sipes 26, and second outboard shoulder sipes 27.

The outboard shoulder lateral grooves 25, for example, extend from the outboard shoulder main groove 4 to the outboard tread edge To. The outboard shoulder lateral grooves 25, for example, are inclined with respect to the tyre axial direction in the same direction as the outboard middle lateral grooves 15. Preferably, angles of the outboard shoulder lateral grooves 25 with respect to the tyre axial direction are in a range of from 10 to 30 degrees, for example.

In this embodiment, the outboard shoulder lateral grooves 25 each include a first groove portion 25a extending from the outboard shoulder main groove 4 and a second groove portion 25b which is connected to the first groove portion 25a and extends to the outboard tread edge To with a larger groove width than that of the first groove portion 25a. In yet some preferred embodiments, one of groove edges of the first groove portion 25a is continuous to one of groove edges of the second groove portion 25b smoothly, e.g., the groove edge drawing an arc curved line with a single radius.

It is preferable that a groove width W4 of the first groove portion 25a, for example, is smaller than groove widths W2 (shown in FIG. 2) of the outboard middle lateral grooves 15. It is preferable that a groove width W5 of the second groove portion 25b, for example, is greater than the groove widths W2 of the outboard middle lateral grooves 15. Preferably, the groove width W5 of the second groove portion 25b, for example, is in a range of from 1.70 to 2.00 times the groove width W4 of the first groove portion 25a. Such outboard shoulder lateral grooves 25 can improve steering stability on dry road conditions and on-snow performance in a well-balanced manner.

A length L3 in the tyre axial direction of each first groove portion 25a, for example, is in a range of from 0.35 to 0.55 times a width W6 of in the tyre axial direction of the outboard shoulder land portion 9. Further, the length L3 in the tyre axial direction of each first groove portion 25a is preferably greater than the lengths Lo in the tyre axial direction of the outboard middle lateral grooves 15 (shown in FIG. 2).

It is preferable that each second groove portion 25b, for example, has a groove depth greater than that of each first groove portion 25a. The groove depth of each second groove portion 25b, for example, is in a range of from 1.5 to 2.0 times the groove depth of each first groove portion 25a. Such outboard shoulder lateral grooves 25 can exhibit excellent on-snow performance by the second groove portions 25b while suppressing reduction in rigidity of the land portion by the first groove portions 25a.

Each first outboard shoulder sipes 26, for example, is configured as a closed sipe which has both ends terminating within the outboard shoulder land portion 9. In the present embodiment, circumferentially adjacent two first outboard shoulder sipes 26 are provided between adjacent outboard shoulder lateral grooves 25 in the tyre circumferential direction.

Lengths in the tyre axial direction of the first outboard shoulder sipes 26, for example, are preferably greater than the length in the tyre axial direction of each first groove portion 25a.

The second outboard shoulder sipes 27 extend from the outboard tread edge To toward the tyre equator C and terminate within the outboard shoulder land portion 9. In the present embodiment, circumferentially adjacent two second outboard shoulder sipes 27 are provided between adjacent the outboard shoulder lateral grooves 25 in the tyre circumferential direction. In some preferred embodiments, the second outboard shoulder sipes 27 are arranged so as not to overlap the first outboard shoulder sipes 26 in the tyre axial direction. Such second outboard shoulder sipes 27 can improve wandering resistance on snow while ensuring rigidity of the land portion.

The outboard shoulder land portion 9 is provided with one or more chamfered portions 28 on a corner between the ground contact surface of the land portion and the land sidewall on the outboard shoulder main groove 4 side. In this embodiment, each chamfered portion 28, for example, is connected to a respective one of the outboard shoulder lateral grooves 25. Such a chamfered portion 28 can be helpful to form a large snow column in cooperation with the outboard shoulder lateral groove 25, improving on-snow performance.

As illustrated in FIG. 1, it is preferable that regions where the chamfered portions 28 are extended in the tyre axial direction cross the respective second outboard middle sipes 17. Such a layout of the chamfered portions 28 can be helpful to suppress uneven wear of the outboard shoulder land portion 9.

Figure 6:
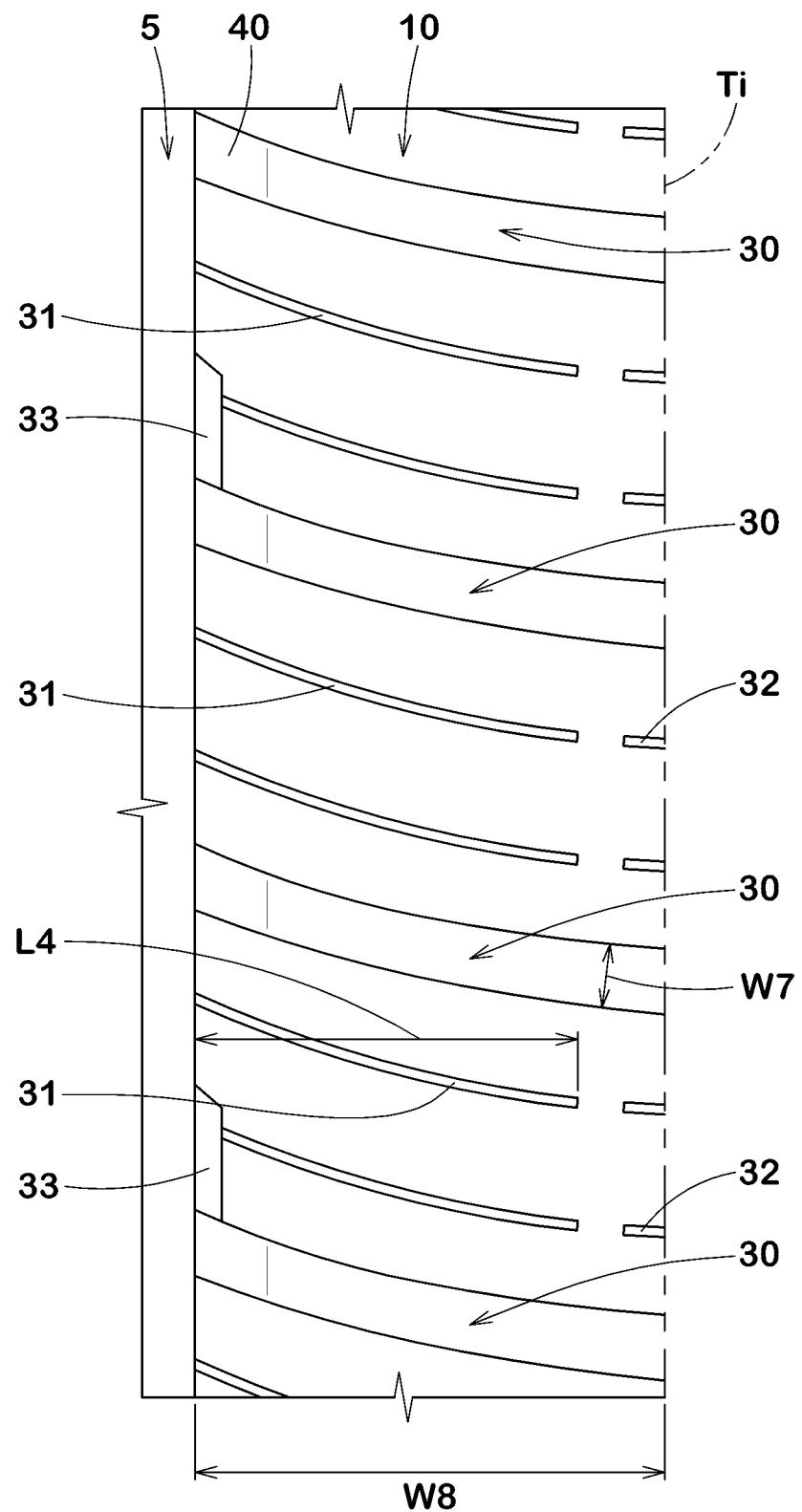
FIG. 6 is an enlarged view of an inboard shoulder land portion of FIG. 1.

FIG. 6 illustrates an enlarged view of the inboard shoulder land portion 10. As illustrated in FIG. 6, the inboard shoulder land portion 10 is provided with inboard shoulder lateral grooves 30, first inboard shoulder sipes 31, and the second inboard shoulder sipes 32.

The inboard shoulder lateral grooves 30, for example, extend from the inboard shoulder main groove 5 to the inboard tread edge Ti. The inboard shoulder lateral grooves 30, for example, are inclined in the same direction as the inboard middle lateral grooves 20 with respect to the tyre axial direction. Angles of the inboard shoulder lateral grooves 30 with respect to the tyre axial direction, for example, are preferably of from 10 to 30 degrees.

Preferably, groove widths W7 of the inboard shoulder lateral grooves 30 are greater than the groove widths W4 (shown in FIG. 5) of the first groove portions 25a of the outboard shoulder lateral grooves 25, at least. In some yet preferred embodiments, the groove widths W7 of the inboard shoulder lateral grooves 30 are greater than not only the groove widths W2 (shown in FIG. 2) of the outboard middle lateral grooves 15 but also the groove widths W3 (shown in FIG. 2) of the inboard middle lateral grooves 20. Such an inboard shoulder lateral grooves 30 can be helpful to exhibit excellent on-snow performance.

Preferably, one or more inboard shoulder lateral grooves 30, for example, include a shallow bottom portion 40 where the groove bottom raises on the inboard shoulder main groove 5 side. Preferably, a length in the tyre axial direction of the shallow bottom portion 40 is preferably smaller than a length in the tyre axial direction of the first groove portion 25a (shown in FIG. 5) of the outboard shoulder lateral grooves 25. Further, a groove depth of the shallow bottom portion 40, for example, is in a range of from 0.55 to 0.70 times the maximum groove depth of the inboard shoulder lateral grooves 30.

The first inboard shoulder sipes 31, for example, extend from the inboard shoulder main groove 5 toward the inboard tread edge Ti and terminate within the inboard shoulder land portion 10. In the present embodiment, circumferentially adjacent two first inboard shoulder sipes 31 are provided between adjacent inboard shoulder lateral grooves 30 in the tyre circumferential direction. Lengths L4 in the tyre axial direction of the first inboard shoulder sipes 31, for example, are in a range of from 0.75 to 0.90 times a width W8 in the tyre axial direction of the inboard shoulder land portion 10.

The second inboard shoulder sipes 32 extend from the inboard tread edge Ti toward the tyre equator C, and terminate within the inboard shoulder land portion 10. In the present embodiment, circumferentially adjacent two second inboard shoulder sipes 32 are provided between adjacent inboard shoulder lateral grooves 30 in the tyre circumferential direction. In some preferred embodiments, the second inboard shoulder sipes 32 are provided so as not to overlap with the first inboard shoulder sipes 31 in the tyre axial direction. Such second inboard shoulder sipes 32 can improve wandering resistance on snow while ensuring rigidity of the inboard shoulder land portion 10.

The inboard shoulder land portion 10 is provided with one or more chamfered portions 33 on a corner between the ground contact surface and the land sidewall on the inboard shoulder main groove 5 side. In the present embodiment, each chamfered portion 33, for example, is connected to a respective one of the inboard shoulder lateral grooves 30 as well as a respective one of the first inboard shoulder sipes 31. Such chamfered portions 33 can suppress uneven wear of the inboard shoulder land portion 10.

While the particularly preferable embodiments in accordance with the present disclosure have been described in detail, the present disclosure is not limited to the illustrated embodiments, but can be modified and carried out in various aspects.

EXAMPLE

Example A

Figure 7:
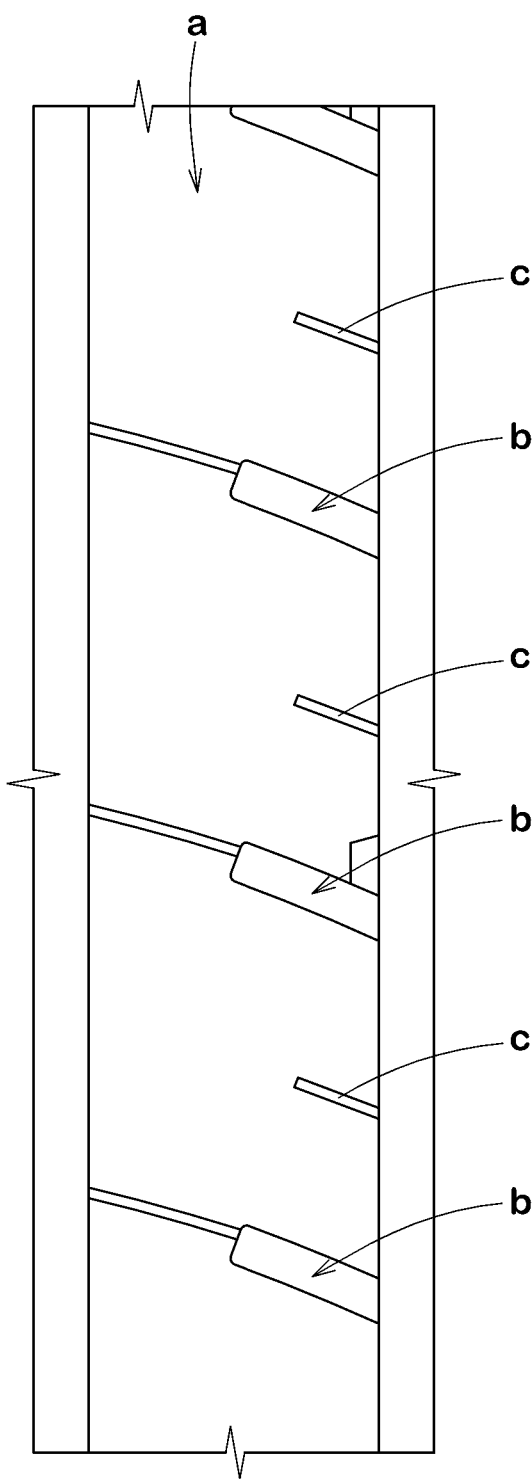
FIG. 7 is an enlarged view of an outboard middle land portion in accordance with a comparative example tyre.

Tyres 185/65R15 having a basic tread pattern shown in FIG. 1 were prototyped. Regarding a comparative example, as illustrated in FIG. 7, a tyre which includes the outboard middle land portion (a) provided with the second outboard middle sipes (c) having lengths in tyre axial direction smaller than the lengths in the tyre axial direction of the outboard middle lateral grooves (b) was also prototyped. The comparative example tyre includes substantially the same tread pattern as one shown in FIG. 1 except for the configuration of the outboard middle land portion. Then, steering stability on dry road conditions and on-snow performance of each test tyres was tested. The common specification and the testing methods for the test tyres are as follows:

rim size: 15×6.0 J,
tyre inner pressure: from 220 kPa, rear 210 kPa,
test vehicle: front wheel drive car with displacement of 1300 cc, and
test tyre location: all wheels.

Steering Stability on Dry Road Condition Test:

A test driver drove the test vehicle to which each test tyre was mounted on a dry road to evaluate the steering stability by the driver's sense. The test results are shown in Table 1 using a score where the comparative example (Ref. 1) is set to 100. The larger value indicates better the steering stability on dry road conditions.

On-Snow Performance Test:

A test driver drove the test vehicle to which each test tyre was mounted on a snowy road to evaluate driving stability by the driver's sense. The test results are shown in Table 1 using a score where the comparative example is set to 100. The larger value indicates better the on-snow performance.

Table 1 shows the test results.

TABLE 1

|  | Ref. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Outboard middle land portion configuration | FIG. 7 | FIG. 1 | FIG. 1 | FIG. 1 | FIG. 1 | FIG. 1 | FIG. 1 | FIG. 1 | FIG. 1 | FIG. 1 |
| Ratios Lo/Wo | 0.50 | 0.50 | 0.40 | 0.45 | 0.55 | 0.60 | 0.50 | 0.50 | 0.50 | 0.50 |
| Ratios L2/Wo | 0.28 | 0.76 | 0.76 | 0.76 | 0.76 | 0.76 | 0.65 | 0.70 | 0.80 | 0.85 |
| Steering stability on dry road conditions (score) | 100 | 100 | 102 | 101 | 100 | 99 | 100 | 100 | 99 | 98 |
| On-snow performance (score) | 100 | 108 | 104 | 106 | 108 | 109 | 107 | 108 | 108 | 109 |

From the test results, it is confirmed that the example tyres, as compared with the comparative example, improve on-snow performance remarkably. Further, it is also confirmed that the example tyres maintain sufficient steering stability on dry road conditions.

Example B

Figure 8:
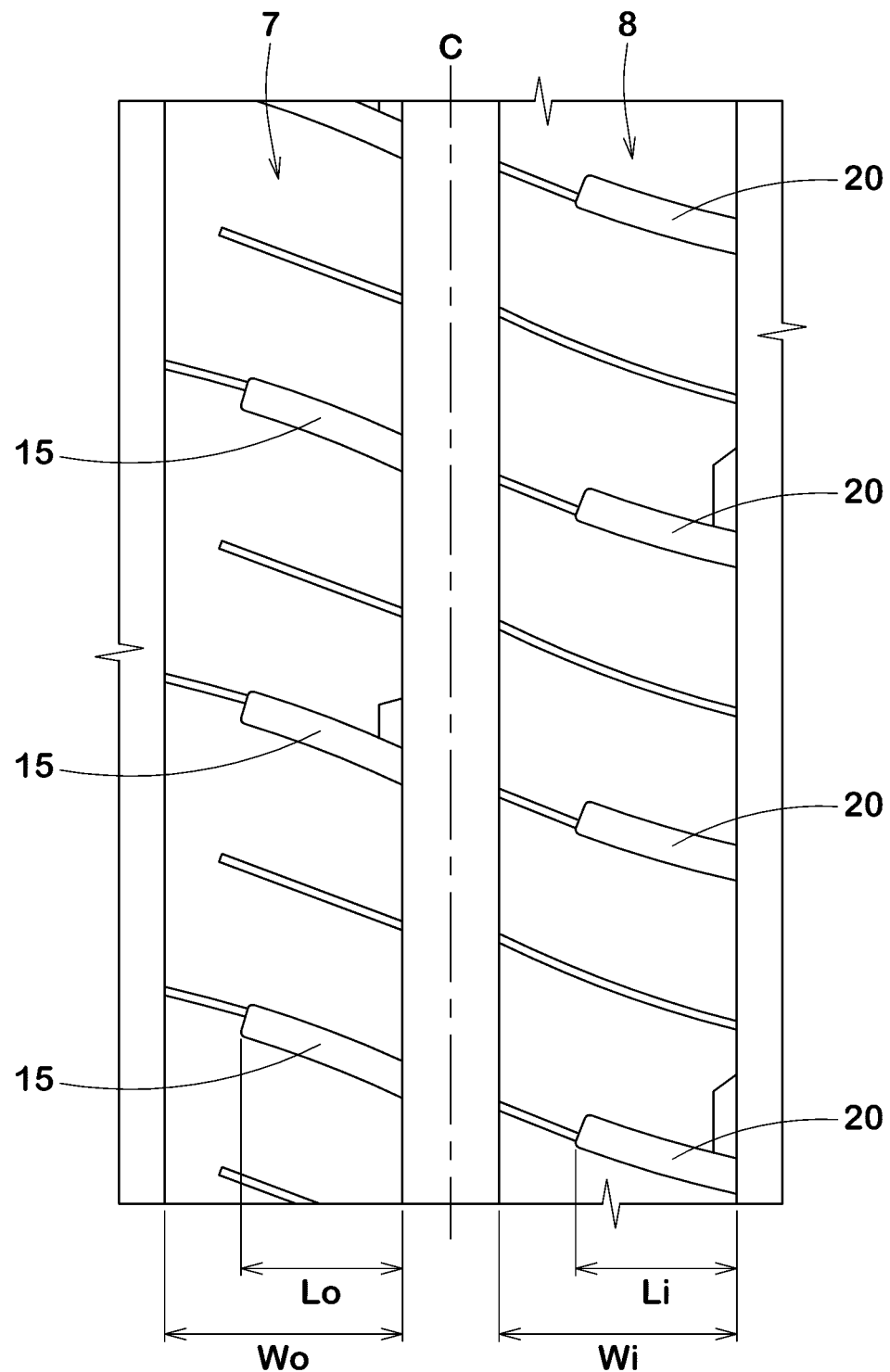
FIG. 8 is an enlarged view of an outboard middle land portion and an inboard middle land portion in accordance with an example tyre.

Tyres 185/65R15 having a basic tread pattern shown in FIG. 1 were prototyped. An example tyre (Ex. 10), as illustrated in FIG. 8, was also prototyped such that ratios Lo/Wo of respective lengths Lo in the tyre axial direction of the outboard middle lateral grooves 15 to the width Wo in the tyre axial direction of the outboard middle land portion 7 is the same as ratios Li/Wi of respective lengths Li in the tyre axial direction of the inboard middle lateral grooves 20 to the width Wi in the tyre axial direction of the inboard middle land portion 8. The reference example tyre includes substantially the same tread pattern as one shown in FIG. 1 except for the above-mentioned configuration. Then, steering stability on dry road conditions and on-snow performance of each test tyres was tested. The common specification and the testing methods for the test tyres are as follows:

Rim size: 15×6.0 J,
Tyre inner pressure: from 220 kPa, rear 210 kPa.
Test vehicle: Front wheel drive car with displacement of 1300 cc,
Test tyre location: all wheels.

Steering Stability on Dry Road Conditions Test:

A test driver drove the test vehicle to which each test tyre was mounted to a dry road to evaluate the steering stability by the driver's sense. The test results are shown in Table 1 using a score where the Ex. 10 is set to 100. The larger value indicates better the steering stability on dry road conditions.

On-Snow Performance Test:

A test driver drove the test vehicle to which each test tyre was mounted to a snowy road to evaluate driving stability by the driver's sense. The test results are shown in Table 1 using a score where the Ex. 10 is set to 100. The larger value indicates better the on-snow performance.

Table 2 shows the test results.

TABLE 2

| | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|
| Configuration of outboard and inboard middle land portions | FIG. 8 | FIG. 1 | FIG. 1 | FIG. 1 | FIG. 1 | FIG. 1 | FIG. 1 | FIG. 1 | FIG. 1 | FIG. 1 |
| Ratio Lo/Wo | 0.68 | 0.50 | 0.40 | 0.45 | 0.55 | 0.60 | 0.50 | 0.50 | 0.50 | 0.50 |
| Ratio Li/Wi | 0.68 | 0.78 | 0.78 | 0.78 | 0.78 | 0.78 | 0.70 | 0.75 | 0.85 | 0.90 |
| Steering stability on dry road conditions (score) | 100 | 103 | 104 | 104 | 102 | 101 | 103 | 103 | 102 | 101 |
| On-snow performance (score) | 100 | 105 | 102 | 104 | 105 | 106 | 104 | 105 | 105 | 106 |

From the test results, it is confirmed that the tires of examples 11-19, as compared with the tire of example 10, improve steering stability on dry road conditions and on-snow performance.

What is claimed is:

1. A tyre comprising:
a tread portion having a designated mounting direction to a vehicle, the tread portion comprising an outboard tread edge which is positioned away from a center of a vehicle when the tyre is mounted to the vehicle, an inboard tread edge which is positioned toward the center of the vehicle when the tyre is mounted to the vehicle, and an outboard middle land portion disposed between the outboard tread edge and a tyre equator,
wherein
the outboard middle land portion comprises
a first longitudinal edge extending in a tyre circumferential direction on the inboard tread edge side of the outboard middle land portion,
a second longitudinal edge extending in the tyre circumferential direction on the outboard tread edge side of the outboard middle land portion,
a ground contact surface formed between the first longitudinal edge and the second longitudinal edge,
outboard middle lateral grooves extending from the first longitudinal edge and having terminal ends terminating within the outboard middle land portion,
first outboard middle sipes extending from the respective terminal ends of the outboard middle lateral grooves to the second longitudinal edge, and
second outboard middle sipes extending from the first longitudinal edge toward the second longitudinal edge beyond the terminal ends of the outboard middle lateral grooves and terminating within the outboard middle land portion,
wherein the outboard middle land portion is not provided with any lateral grooves that extend from the second longitudinal edge toward the first longitudinal edge so as to reach a center location in a tyre axial direction of the outboard middle land portion, and
wherein no grooves nor sipes are connected to the second longitudinal edge of the outboard middle land portion except for the first outboard middle sipes.

2. The tyre according to claim 1,
the tread portion further comprising
an outboard shoulder main groove extending continuously in the tyre circumferential direction adjacent to the outboard middle land portion on the outboard tread edge side, and
an outboard shoulder land portion defined between the outboard shoulder main groove and the outboard tread edge,
wherein the outboard shoulder land portion is provided with outboard shoulder lateral grooves extending from the outboard shoulder main groove to the outboard tread edge.

3. The tyre according to claim 2, wherein
each outboard shoulder lateral groove comprises a first groove portion extending from the outboard shoulder main groove and a second groove portion connected to the first groove portion, wherein the second groove portion has a groove width greater than that of the first groove portion and extends to the outboard tread edge.

4. The tyre according to claim 3, wherein
a length in the tyre axial direction of the first groove portion of each outboard shoulder lateral groove is greater than lengths in the tyre axial direction of the outboard middle lateral grooves.

5. The tyre according to claim 2, wherein
the outboard shoulder land portion comprises a corner formed between a ground contact surface thereof and a land sidewall, and
the corner is provided with a chamfered portion.

6. The tyre according to claim 5, wherein
each chamfered portion is connected to a respective one of the outboard shoulder lateral grooves.

7. The tyre according to claim 5, wherein
a region where the chamfered portion is extended in the tyre axial direction crosses at least one of the second outboard middle sipes.

8. The tyre according to claim 3, wherein
a groove width of the first groove portion of each outboard shoulder lateral groove is smaller than groove widths of the outboard middle lateral grooves.

9. The tyre according to claim 1,
the tread portion further comprising an inboard middle land portion disposed between the inboard tread edge and the tyre equator, wherein
the inboard middle land portion comprises
a first longitudinal edge extending in the tyre circumferential direction on the inboard tread edge side of the inboard middle land portion,
a second longitudinal edge extending in the tyre circumferential direction on the outboard tread edge side of the inboard middle land portion,
a ground contact surface formed between the first longitudinal edge and the second longitudinal edge, and
inboard middle lateral grooves extending from the first longitudinal edge of the inboard middle land portion to terminal ends thereof terminating within the inboard middle land portion, wherein
ratios Li/Wi of respective lengths Li in the tyre axial direction of the inboard middle lateral grooves to a width Wi in the tyre axial direction of the inboard middle land portion are greater than ratios Lo/Wo of respective lengths Lo in the tyre axial direction of the outboard middle lateral grooves to a width Wo in the tyre axial direction of the outboard middle land portion.

10. The tyre according to claim 9, wherein
the lengths Li of the inboard middle lateral grooves are greater than the lengths Lo of the outboard middle lateral grooves.

11. The tyre according to claim 9,
the inboard middle land portion being further provided with first inboard middle sipes extending from the terminal ends of the respective inboard middle lateral grooves to the second longitudinal edge of the inboard middle land portion.

12. The tyre according to claim 11, wherein
regions where the first inboard middle sipes are extended toward the outboard tread edge cross regions where the outboard middle lateral grooves are extended toward the inboard tread edge.

13. The tyre according to claim 9, wherein
the inboard middle land portion is not provided with any lateral grooves that extend from the second longitudinal edge of the inboard middle land portion toward the first longitudinal edge of the inboard middle land portion so as to reach a center location in the tyre axial direction of the inboard middle land portion.

14. The tyre according to claim 9, wherein
the inboard middle lateral grooves extend in a constant groove width, and the outboard middle lateral grooves extend in a constant groove width.

15. The tyre according to claim 9, wherein
the outboard middle lateral grooves extend so as to reach a center location in the tyre axial direction of the outboard middle land portion.

16. The tyre according to claim 9, wherein
the outboard middle land portion comprises a corner formed between the ground contact surface thereof and a land sidewall on the first longitudinal edge side of the outboard middle land portion, and
the corner is provided with one or more chamfered portions.

17. The tyre according to claim 1, wherein each outboard middle lateral groove is inclined in a first direction with respect to the tyre axial direction over an entire length thereof, and each first outboard middle sipe is inclined in the first direction with respect to the tyre axial direction over an entire length thereof.

18. A tyre comprising:
a tread portion having a designated mounting direction to a vehicle, the tread portion comprising an outboard tread edge which is positioned away from a center of a vehicle when the tyre is mounted to the vehicle, an inboard tread edge which is positioned toward the center of the vehicle when the tyre is mounted to the vehicle, and an outboard middle land portion disposed between the outboard tread edge and a tyre equator, wherein
the outboard middle land portion comprises
a first longitudinal edge extending in a tyre circumferential direction on the inboard tread edge side of the outboard middle land portion,
a second longitudinal edge extending in the tyre circumferential direction on the outboard tread edge side of the outboard middle land portion,
a ground contact surface formed between the first longitudinal edge and the second longitudinal edge,
outboard middle lateral grooves extending from the first longitudinal edge and having terminal ends terminating within the outboard middle land portion,
first outboard middle sipes extending from the respective terminal ends of the outboard middle lateral grooves to the second longitudinal edge, and
second outboard middle sipes extending from the first longitudinal edge toward the second longitudinal edge beyond the terminal ends of the outboard middle lateral grooves and terminating within the outboard middle land portion,
wherein the outboard middle land portion is not provided with any lateral grooves that extend from the second longitudinal edge toward the first longitudinal edge so as to reach a center location in a tyre axial direction of the outboard middle land portion, and
wherein the outboard middle land portion is not provided with any other sipes except for the first outboard middle sipes and the second outboard middle sipes.

19. The tyre according to claim 18, wherein each outboard middle lateral groove is inclined in a first direction with respect to the tyre axial direction over an entire length thereof, and each first outboard middle sipe is inclined in the first direction with respect to the tyre axial direction over an entire length thereof.

20. The tyre according to claim 18, wherein
the tread portion further comprises an inboard middle land portion disposed between the inboard tread edge and the tyre equator,
the inboard middle land portion comprises
- a first longitudinal edge extending in the tyre circumferential direction on the inboard tread edge side of the inboard middle land portion,
- a second longitudinal edge extending in the tyre circumferential direction on the outboard tread edge side of the inboard middle land portion,
- a ground contact surface formed between the first longitudinal edge and the second longitudinal edge, and
- inboard middle lateral grooves extending from the first longitudinal edge of the inboard middle land portion to terminal ends thereof terminating within the inboard middle land portion, and ratios Li/Wi of respective lengths Li in the tyre axial direction of the inboard middle lateral grooves to a width Wi in the tyre axial direction of the inboard middle land portion are greater than ratios Lo/Wo of respective lengths Lo in the tyre axial direction of the outboard middle lateral grooves to a width Wo in the tyre axial direction of the outboard middle land portion.

* * * * *